ing the zirconium tetrachloride enriched solvent phase from the other end of the contact zone, and separating from the solvent phase a purified zirconium tetrachloride having less than 200 ppm hafnium, and said process including the step of recycling the solvent to the contact zone and adding $AlCl_3$ when the solvent is an alkali metal chloroaluminate and $FeCl_3$ when the solvent is an alkali metal chloroferrate, and mixtures of $AlCl_3$ and $FeCl_3$ when the solvent is a mixture of alkali metal chloroaluminate and alkali metal chloroferrate to maintain the molar ratio of n/p.

2. A process as claimed in claim 1 in which the molar ratio of n/p is maintained within the range of 1.04 to 1.10.

3. A process as claimed in claim 1 in which the operating pressure is substantially equal to atmospheric pressure.

4. A process as claimed in claim 1 wherein Me is potassium.

5. A process as claimed in claim 1, which includes extracting hafnium-free zirconium tetrachloride by an inert carrier gas, and subsequently recovered by means of a condenser.

6. A process as claimed in claim 5 in which the inert carrier gas is nitrogen.

7. A process as claimed in claim 1, wherein the hafnium-free zirconium tetrachloride is extracted at reduced pressure and recovered by means of a condenser.

8. A process as claimed in claim 1 wherein the contact zone includes an absorber/condenser designed to retain solvent passing through said zone to dissolve therein zirconium and hafnium tetrachloride and stabilize the temperature at the head of the contact zone.

9. A process as claimed in claim 1 wherein the zirconium tetrachloride is separated from the solvent by passing nitrogen gas through the solution to vaporize off the zirconium tetrachloride, separating the vapors of zirconium tetrachloride and nitrogen, cooling the removed vapors to condense hafnium free zirconium tetrachloride, and recycling the nitrogen gas to the vaporizer.

* * * * *

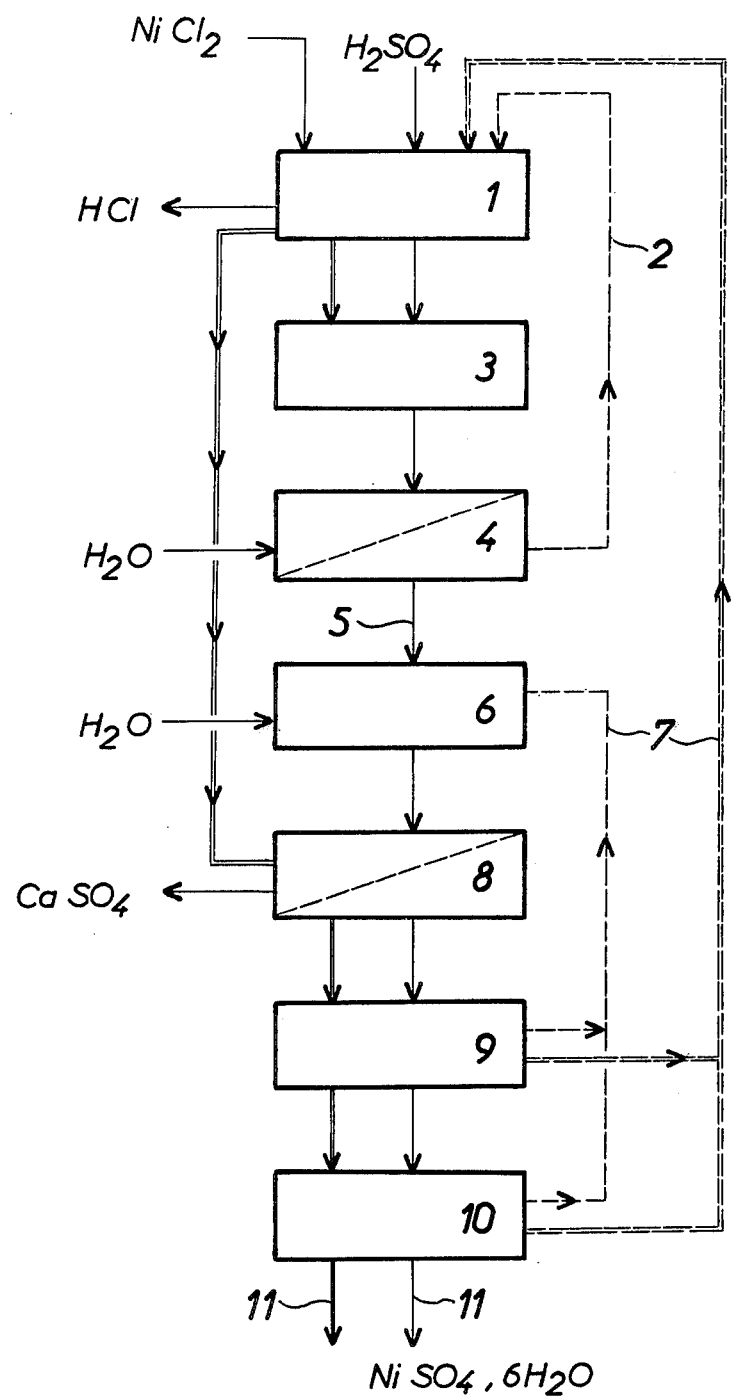

PROCESS FOR THE PRODUCTION OF HYDRATED NICKEL SULPHATE

This is a continuation application of Ser. No. 419,542, filed Nov. 28, 1973 now abandoned.

The present invention relates to an industrially applicable process for the production of hydrated nickel sulphate from a solution of pure nickel chloride. Such a solution may be obtained, for example, by the methods described in U.S. Pat. Nos. 3,839,168 and 3,840,446.

Known processes for the production of nickel sulphate include the action of sulphuric acid on metallic nickel or on any other nickeliferous substance. These processes have numerous drawbacks such as the need to purify the solutions obtained by a physical or physico-chemical method. Moreover, some of these processes give rise to a pasty phase which is difficult to handle.

According to the present invention, there is provided a process for the production of hydrated nickel sulphate comprising:

reacting a mixture including sulphuric acid and a pure solution of nickel chloride at the boiling point of the mixture and removing the hydrochloric acid gas formed, clarifying the reaction mixture, crystallising nickel sulphate from the clarified mixture and recycling the mother-liquor to an earlier stage of the process, and dewatering the crystals of nickel sulphate and recycling the mother-liquor to said earlier stage of the process.

In a first form of embodiment of the invention, the process further comprises, after the reacting and prior to the clarifying stage, the stages of filtration with recycling of the filtrate to said reacting stage, the quantity of sulphuric acid in the reacting stage mixture being between 1.5 and 3 times the quantity required stoichiometrically for conversion of all the nickel chloride into nickel sulphate, which filtration is followed, prior to the clarifying stage, by said earlier stage in the process, which is constituted by redissolution of the partially hydrated sulphate, obtained in the filtration, in said mother-liquors.

Preferably, the redissolution is performed also with water, provided before, and/or as diluent of, said mother-liquors.

In a second embodiment, said earlier stage is the reacting of a mixture, and the quantity of sulphuric acid in the mixture is between 0.9 and 1.1 times the quantity required stoichiometrically for conversion of all the nickel chloride into nickel sulphate. It is then possible to omit the stages of cooling and filtration, and of redissolution, the mother-liquors produced during the crystallisation stage and during the dewatering stage being recycled into the reaction stage.

The invention will now be described, purely by way of example, with reference to the accompanying drawings, which represents a flow chart of the process.

A pure solution of nickel chloride, and a stream of sulphuric acid, and precipitation mother-liquors 2 are all fed into sulphating reaction vessel 1. The overall quantity of sulphuric acid which should be fed in should amount to between 1.5 and 3 times the quantity required stoichiometrically to convert the whole of the chloride fed into the reaction vessel 1 into nickel sulphate. As the mother-liquor 2 normally contains uncombined sulphuric acid, only a make-up quantity of acid has to be supplied at 1 in the form of industrial grade acid. The reaction, which gives rise to hydrochloric acid, is performed at boiling point and may be carried out at atmospheric pressure, but is preferably performed under reduced pressure, for example 0.5 bar below atmospheric.

A product of the reaction in the vessel 1 is hydrochloric acid, which is formed as the gas and is removed, for instance by absorption in a lined or faced column, with recycling of a condensate fraction. After due removal of this hydrochloric acid, the residual suspension is withdrawn and cooled to ambient temperature at 3, as shown by the single lines in the flow chart, this suspension being filtered and washed with water at 4, the mother-liquors 2 are recycled to the sulphating reaction vessel 1.

The solid product or filter cake 5 obtained from being filtered at 4 is a partially hydrated nickel sulphate which is conveyed to a stage 6 for redissolution in mother-liquors 7 or in water, or in mother-liquors 7 diluted with water. After being concentrated, the solution is clarified in a chamber 8, where a variety of impurities such as calcium sulphate may be separated from the solution. The solution is then crystallised in 9 and the crystals obtained are dewatered in 10 such as to permit crystals of pure hexahydrated nickel sulphate to be collected from 11. The mother-liquors collected during crystallisation in 9 and dewatering 10 constitute the mother-liquors 7 which, as stated above, are recycled to the stage 6 of redissolution of the partially hydrated nickel sulphate 5.

In a modified form of this process, the overall quantity of sulphuric acid fed in at 1 amounts to between 0.9 and 1.1 times (rather than 1.5 to 3 times) the stoichiometrical quantity; then it is possible to eliminate the stages of partially hydrated nickel sulphate 5 and redissolution 6. In this case, the stages of the process, denoted by double lines in the flow chart, are the following: sulphating 1, clarifying 8, crystallising 9 and dewatering 10. Mother-liquors 7 are recycled from 9 and 10 to the sulphating stage 1. The crystals of hexahydrated nickel sulphate 11 which are obtained in this manner may then be washed with water, with alcohol or with a solution of nickel sulphate to reduce their chloride ion concentration.

Of the following examples, which will be described with reference to the accompanying FIGURE, Example 1 relates to the first embodiment described above denoted by single lines, and Example II relates to the second embodiment shown by double lines.

EXAMPLE 1

109 liters of a solution of nickel chloride containing 198 grammes/liter of nickel and 0.5 gramme/liter of sulphate ions are fed into a double-walled reaction vessel 1, as are 85 liters of mother-liquors 2 of crystallisation of partially hydrated sulphate originating from a preceding cycle and containing 39 grammes/liter of nickel and 800 grammes/liter of sulphate ions; to this mixture is added 35 kg of 98% sulphuric acid. The contents of the reactor 1 are heated to boiling point under a pressure of 0.5 bar until, due to volatilisation and removal of hydrochloric acid gas, the proportion of chloride ions in the solution falls to near 3 grammes/liter. The solution is taken to a vessel 3 for cooling with stirring, the resulting suspension is filtered at 4, and there were obtained 58.5 kg of partially hydrated crystals 5 of nickel sulphate, found to contain 30.75% of nickel and 0.023% of chloride ions. The filtrate from 4 constitutes the mother-liquors 2 in which the chloride concentration is 3.76 grammes/liter.

The 58.5 kg of crystals 5 are redissolved at 6 in 60 liters of mother-liquors 7 of hydrated sulphate crystallisation originating from a preceding cycle, and diluted with 200 liters of water. After clarifying at 8, concentrating to a specific density of 1.49, crystallising at 30° C 9 and dewatering at 10, 55 kg of hexahydrated nickel sulphate crystals 11 are obtained containing 0.006% of chloride ions. The proportion of chloride ions in the crystallisation mother-liquors 7 resulting from the stages 9 and 10 is 1.14 gramme/liter.

The analysis by weight of the crystals 11 obtained is as follows:

| Ni | : | 21.4 % | Zn | : | 0.001 % |
|---|---|---|---|---|---|
| Na | : | 0.001 % | Pb | : | 0.001 % |
| Fe | : | 0.003 % | Cl⁻ | : | 0.006 % |
| Cu | : | 0.001 % | Mn | : | 0.001 % |
| CaO | : | 0.005 % | S⁻⁻ | : | none |

EXAMPLE 2

1.5 liter of a solution of nickel chloride containing 177 grammes/liter of nickel, together with 450 grammes of 98% sulphuric acid, are fed into a double-walled reaction vessel 1 which is equipped with a "descending" cooling system and which is maintained at boiling point until, due to volatilisation and removal of HCl, traces of insoluble sulphate first appear, cooling then being allowed to proceed at 3 with gentle stirring. Hydrated crystals are separated at 9 from the mother-liquors. After dewatering 10, nickel sulphate crystals 11 are obtained, containing 21.7% of nickel and 0.5% of chlorine, the concentration of chlorine in the mother-liquors 7 amounting to 130 grammes/liter. The analysis of the crystals 11 is otherwise as in Example 1. The chlorine proportion diminishes to 0.040% if these crystals 9 are washed with water before being dried at 10, in the proportion of 0.5 liter of water per kilogramme of hydrated sulphate.

The hexahydrated sulphate or the heptahydrated sulphate can be obtained at will by adjusting the crystallisation temperature. In Example 1, in which this temperature is 30° C, a mixture of these two kinds of sulphate is obtained, as demonstrated by the fact that the proportion of nickel in the product is 21.4%, whereas it would theoretically be 22.3% in pure hexahydrated sulphate and 20.9% in pure heptahydrated sulphate.

This process renders it possible to recover hydrochloric acid, which may be used to produce supplementary quantities of pure nickel.

What we claim is:

1. A process for the production of hydrated nickel sulphate, comprising successively the following steps:
   a. reacting sulphuric acid, nickel chloride, and the recycled mother-liquor from steps (c) and (d) in a sulphating reaction vessel at the boiling point of the reaction mixture to obtain a solution of nickel sulphate containing suspended impurities, while partially removing the hydrogen chloride gas formed until the chloride concentration has been reduced to about from 3 to 130 grams per liter, the total amount of sulphuric acid in said reaction mixture being between 0.9 and 1.1 times the quantity required stoichiometrically for the conversion of all the nickel chloride into nickel sulphate;
   b. clarifying said nickel sulfate solution obtained from step (a) to remove suspended impurities comprising calcium sulphate;
   c. crystallizing nickel sulfate from the clarified solution from step (b), and recycling the mother-liquor obtained at this stage to the sulphating reaction vessel of step (a);
   d. dewatering the wet crystals from step (c) to obtain substantially dry hexahydrate crystals essentially free from chloride ions, and recycling the mother-liquor obtained at this stage to the sulphating reaction vessel of step (a); and
   e. washing said substantially dry hexahydrate crystals obtained from step (d) with a member selected from the group consisting of water, alcohol, and a solution of nickel sulphate.

2. The process of claim 1 in which the dried crystals of nickel sulphate hexahydrate from step (e) contain about 0.040% by weight of chloride ions.

3. A process for the production of hydrated nickel sulphate, comprising successively the following steps:
   a. reacting sulphuric acid, nickel chloride, and the recycled mother-liquor from step (c), in a sulphating reaction vessel at the boiling point of the reaction mixture to obtain a suspension of nickel sulphate, while partially removing the hydrogen chloride gas formed until the chloride concentration has been reduced to about from 3 to 130 grams per liter, the total amount of sulphuric acid in said reaction mixture being between 1.5 and 3 times the quantity required stoichiometrically for the conversion of all the nickel chloride into nickel sulphate;
   b. cooling the suspension of nickel sulphate;
   c. filtering the cooled suspension of nickel sulphate, washing the resulting filter cake of partially hydrated nickel sulphate, and recycling the mother-liquor obtained at this stage to the sulphating reaction vessel of step (a) above;
   d. redissolving the partially hydrated nickel sulphate obtained from step (c) in a redissolver by means of a solvent selected from the group consisting of water, the mother-liquors recycled from steps (f) and (g), and mixtures thereof, and the resulting solution then concentrated;
   e. clarifying the concentrated solution of nickel sulphate obtained from step (d) to remove impurities comprising calcium sulphate;
   f. crystallizing the clarified solution from step (e), and recycling the mother-liquor obtained at this stage to the redissolver in step (d); and
   g. dewatering the wet crystals from step (f) to obtain substantially dry hexahydrate crystals of nickel sulphate essentially free from chloride ions, and recycling the mother-liquor obtained at this stage to the redissolver in step (d) above.

4. The process of claim 3 in which the sulphating reaction in step (a) is carried out at a pressure of .5 bar below atmospheric pressure.

5. The process of claim 3 in which the nickel sulphate suspension is cooled to ambient temperature in step (b).

6. The process of claim 3 in which the dried crystals of nickel sulphate hexahydrate from step (g) contain about 0.006% by weight of chloride ions.

* * * * *